United States Patent Office.

IMPROVED FLUX FOR WELDING, PUDDLING, AND BRAZING IRON AND STEEL.

ANTHONY J. HINDERMEYER, OF ROHRERSTOWN, PENNSYLVANIA.

Letters Patent No. 60,516, dated December 18, 1866.

The Schedule referred to in these Letters Patent and making part of the same.

TO ALL WHOM IT MAY CONCERN:

Be it known that I, ANTHONY J. HINDERMEYER, of Rohrerstown, (Hempfield Post Office,) in the county of Lancaster, State of Pennsylvania, have invented a new and useful Flux for Welding, Puddling, and Brazing Metals; and I do hereby declare the following to be a full and exact description of the same.

My present invention is an improvement upon the flux for welding and brazing, for which a patent was granted to me on the 30th day of October, 1866; and the nature of the improvement consists in the combination of about one-third of oyster-shells with two-thirds of the chalcedony quartz, the two substances being powdered and mixed together, and in this condition applied as a flux in the ordinary manner, well known to every blacksmith and practical metallurgist. The chalcedony quartz, which I have heretofore used as a flux without any other admixture, and which generally gives very excellent results, is, however, greatly improved by the addition of the oyster-shells in the above proportion; the latter preserves the steel more effectually from burning, and by repeated trials I have further discovered that this improved compound acts as a very efficient and valuable physic for cleansing and improving the character of iron in the puddling furnace. I have repeatedly put the commonest pig-iron into the furnace, and when it had melted I threw in this flux or physic, with which it was worked in the usual manner, and from the iron thus produced horse-shoe nails of good quality were made. As a flux for welding steel upon iron, or for welding iron to iron, this improved compound gives the most satisfactory results, and it is also very efficient and useful when applied as a flux in the operation of brazing.

What I claim as my invention, and desire to secure by Letters Patent, is—

The use of the herein-described compound as a flux for welding and brazing, and as a physic for cleansing and improving iron in the operation of puddling.

A. J. HINDERMEYER.

Witnesses:
MATTHIAS MAAG,
ISAIAH MATLACK.